United States Patent [19]

Salge et al.

[11] 4,434,732
[45] Mar. 6, 1984

[54] OPERATION CONTROLLER FOR AN ELECTRONIC SEWING MACHINE

[75] Inventors: Edward A. Salge, Parlin; Leonard I. Horey, West Orange, both of N.J.

[73] Assignee: The Singer Company, Stamford, Conn.

[21] Appl. No.: 302,290

[22] Filed: Sep. 15, 1981

[51] Int. Cl.³ .............................................. D05B 3/02
[52] U.S. Cl. .............................................. 112/158 E
[58] Field of Search .......... 112/158 E, 121.11, 121.12, 112/275, 277

[56] References Cited

U.S. PATENT DOCUMENTS 4,318,357  3/1982  Minalga et al. ................. 112/158 E
4,326,473  4/1982  Kigawa .......................... 112/158 E Primary Examiner—Peter P. Nerbun
Attorney, Agent, or Firm—David L. Davis; Robert E. Smith; Edward L. Bell

[57] ABSTRACT

A microcomputer controlled electronic sewing machine wherein the microcomputer operates in two modes of execution: a background mode for performing non-critical functions and an interrupt mode for performing functions dependent on the operational state of the sewing machine.

13 Claims, 19 Drawing Figures

OPERATION CONTROLLER FOR AN ELECTRONIC SEWING MACHINE

DESCRIPTION

BACKGROUND OF THE INVENTION

This invention relates to electronically controlled sewing machines of the type having a microcomputer for monitoring operator actuatable controls, retrieving pattern data from a memory, manipulating that data, and controlling the positioning of the needle and work piece during the sewing operation.

The use of microcomputers for controlling certain operations of a sewing machine has recently been proposed. Such use typically involves a single set of coded instructions resident in memory and being continuously executed by the microcomputer. A sync pulse is generated in timed relation with the needle and work feed mechanisms that is detected by the microcomputer thereby enabling the data output drivers to output bight and feed data to the servo systems for actuating the needle and work feed mechanisms. See, for example, U.S. Pat. No. 4,142,473, dated Mar. 6, 1979, to Itoh, which discloses an electronically controlled sewing machine including a microcomputer having the capability to produce any number of stitch patterns in the order in which they were selected by the operator. When the microcomputer is ready to output stitch data to the bight and feed servo systems, it enables a schmitt trigger which is arranged to pass a signal from an optical interruptor device to an input line of the microcomputer. The optical interruptor, comprising a light emitter and detector pair, produces signals in timed relation to the rotation of the armshaft. Once the schmitt trigger is enabled, the microcomputer will wait in a software loop continuously interrogating the input line until a signal is received from the optical interruptor at which time the bight or feed data is output to the appropriate servo. A serious problem associated with this arrangement is the inability of the microcomputer to adequately control the various functions of the sewing machine while waiting in the software loop should the armshaft rotation be temporarily slowed or stopped completely.

Additionally, see U.S. Pat. No. 4,280,424, dated July 28, 1981, to Carbonato et al, which discloses an electronically controlled sewing machine including a microcomputer having the capability to operate on stored stitch pattern data in response to input control signals from the keyboard for redefining the stitch pattern data. Carbonato utilizes a clock interruption scheme to divert execution from the main processing program to an interrupt routine for performing certain housekeeping tasks such as decrementing a clock counter and scanning the keyboard for operator actuated keys. Pattern data is retrieved for the selected pattern and appropriate initialization procedures are carried out. The main processing program then controls the sewing operation including output of stitch pattern data to the bight and feed servo systems. The microcomputer must continually interrogate input lines for the presence of bight and feed sync signals to assure correct timing of data output to the servos. This results in substantial wasted MC time. Further, the interrupt routine has no provision for refreshing the current status of the bight and feed servo systems thereby providing an opportunity for the bight and feed mechanisms to drift.

OBJECTS OF THE INVENTION

It is an object of the present invention to overcome these difficulties of the prior art by providing an electronically controlled sewing maching having a microcomputer for controlling the sewing operation wherein the microcomputer has a background mode of execution wherein the selection panel is continuously scanned for operator influence and an interrupt mode of execution wherein bight and feed sync pulses are sensed in addition to clock pulses so that stitch pattern data can be timely updated and passed to the bight and feed servo systems.

It is another object of this invention to prevent dimming of the LED indicator lights, associated with the selection panel for indicating operator influence thereof, by timely refreshing the signals thereto.

It is another object of this invention to prevent drift of the bight and feed servo systems by timely refreshing the signals thereto.

It is another object of this invention to provide a unique method of controlling the operation of an electronic sewing machine.

Other objects and advantages of the invention will become apparent through reference to the accompanying drawings and descriptive matter which illustrate a preferred embodiment of this invention.

SUMMARY OF THE INVENTION

According to the present invention, there is provided an electronically controlled sewing machine having sewing instrumentalities for sewing a plurality of different stitch patterns. The sewing machine includes a rotatable armshaft, signal means associated with the rotatable armshaft for providing a bight signal and a feed signal in timed relation to said sewing instrumentalities, panel selection means responsive to operator influence for selecting a pattern and a microcomputer including a memory. A control means is provided including a set of coded instructions that are stored in the memory and executable by the microcomputer for controlling the operation of the sewing machine. The controlling occurs in a first mode of execution of the microcomputer and in a second mode of execution wherein the first mode of execution is effective continuously except for predetermined interruptions and the second mode of execution is effective only during the predetermined interruptions. The interruptions are effected in response to the bight and feed signals.

BRIEF DESCRIPTION OF THE DRAWINGS

In order that the invention be more fully understood, it will now be described by way of example with reference to the accompanying drawings in which.

DESCRIPTION OF THE PREFERRED EMBODIMENT

Figure 1:
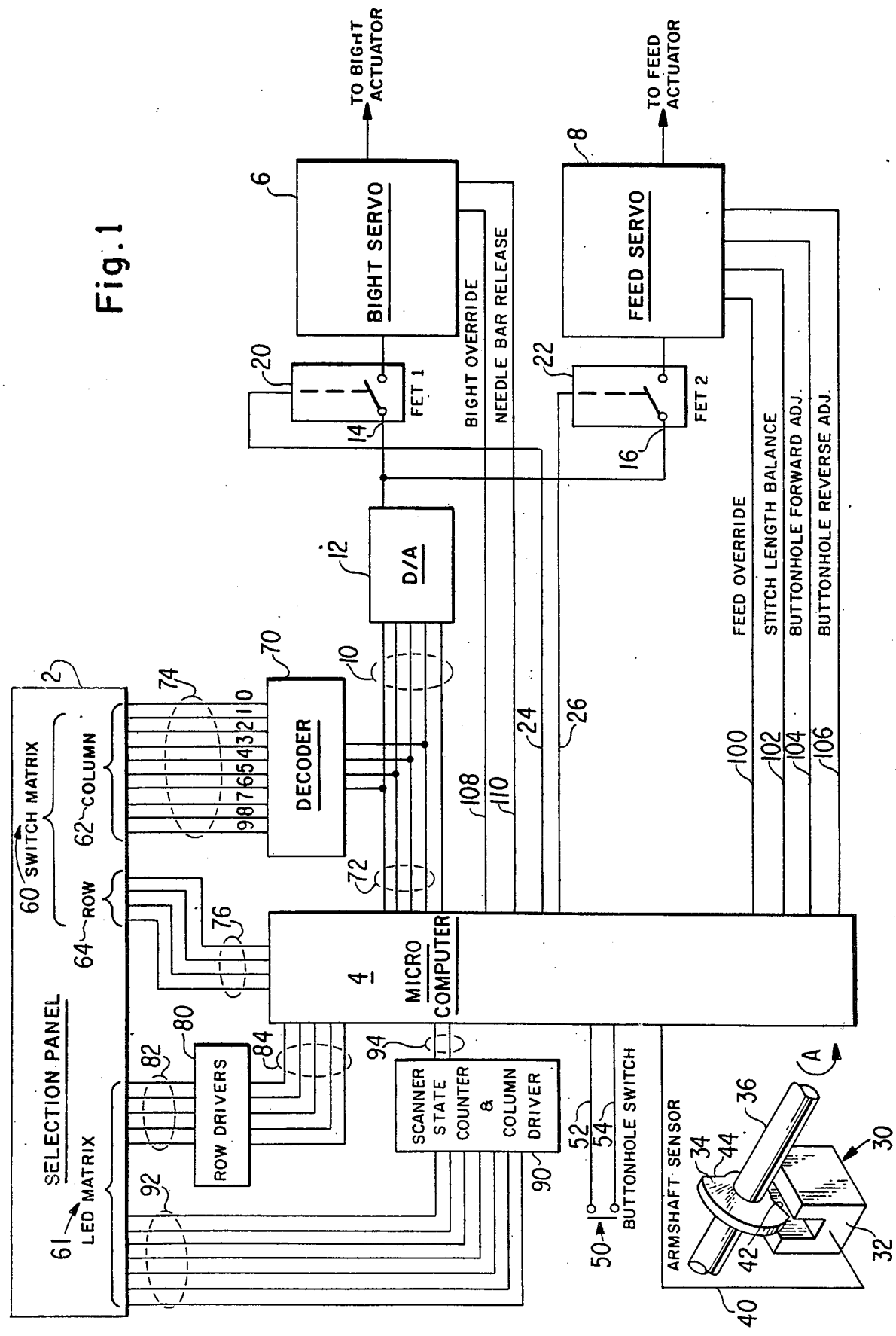
FIG. 1 is a block diagram of an operation controller and associated interconnections with portions of an electronic sewing machine having the present invention incorporated therein.

Referring to FIG. 1, there is shown a selection panel 2 of a sewing machine, not shown, interconnected to a microcomputer (MC) 4, a bight servo system 6, and a feed servo system 8. The bight servo 6 actuates the needle bar mechanism, not shown, of the sewing machine and the feed servo 8 actuates the work feed mechanism, not shown, of the sewing machine, both in accordance with stitch pattern data processed by the MC. These servo systems are similar to those disclosed in U.S. Pat. No. 3,984,745, dated Oct. 5, 1976, to Minalga, the teachings of which are incorporated herein by reference.

Digital bight and feed data, which is stored in memory internal to the MC 4, and applied to the lines 10 by the MC 4 is converted to an analog signal by the digital to analog converter 12, the resulting analog signal being applied to both terminal 14 of the FET switch 20 and terminal 16 of the FET switch 22. When the MC 4 outputs bight data on the lines 10, the MC 4 also applies a signal to line 24 for closing the FET switch 20, thereby providing a circuit path for the data to the bight servo system 6. Similarly, when the MC 4 outputs feed data on the lines 10, the MC 4 also applies a signal to line 26 for closing the FET switch 22 thereby providing a circuit path for the data to the feed servo system 8.

An optical interrupter device 30 comprising a light emitter and detector pair 32 and a light gate 34 arranged to rotate with the armshaft 36, as indicated by the arrow A, outputs a feed sync signal on line 40 when the edge 42 interrupts the beam of light between the emitter and detector pair 32. As the gate 34 continues to rotate with the armshaft the edge 44 eventually moves out of the path of the light beam thereby causing a bight sync signal to be applied to line 40. Therefore, for every revolution of the armshaft, one feed sync signal and one bight sync signal is applied to line 40 which may be interrogated by the MC 4. This arrangement for generating bight and feed sync signals is only illustrative for purposes of this disclosure and should not be deemed to limit the scope of this invention in any way.

The selection panel 2 includes a switch matrix 60 and an LED matrix 61 arranged thereon. The switch matrix 61 is physically arranged in ten columns 62 and four rows 64 while the LED matrix is arranged in seven columns and five rows. A binary to decimal decoder 70 is interconnected to the MC 4 by the four lines 72 and to the columns 62 by the ten lines 74. The MC 4 is interconnected to the four rows 64 by the four lines 76. The decoder 70 is arranged so that when a binary number is applied to the four lines 72 by the MC 4, the decoder 70 will translate the binary input to a number from 0 to 9 and apply a signal to the individual line of the 10 lines 74 corresponding to the translated number. Should one of the switches in the corresponding column of the switch matrix 60 be closed then the signal from the decoder will appear on one of the four lines 76. The MC 4 may then interrogate the four lines 76 and determine which specific switch is closed.

The LED matrix 61 is interconnected to the MC 4 via a row driver unit 80 by four lines 82 and four lines 84. Additionally, a scanner and column driver 90 is interconnected by seven lines 92 to the LED matrix 61 and by two lines 94 to the MC 4. This arrangement permits the MC 4 to periodically pulse the scanner 90 via the lines 94 causing the scanner to apply a signal individually to each of the seven lines 92 in seriatim. In correspondence to the scanning, appropriate signals are applied to the lines 84 by the MC 4 which are input to a series of transistor drivers which, via the lines 82 will turn on the appropriate individual LEDs of the LED matrix 61.

The MC 4 has four control lines to the feed servo system 8 including: feed override 100 which operates an FET for enabling a feed override control for effecting operator modification of the standard feed; stitch length balance 102 which operates an FET for enabling a balance control for balance forward and reverse stitch length; buttonhole forward adjust 104 which operates an FET for enabling a preprogrammed stitch length for forward feed when sewing a buttonhole; and buttonhole reverse adjust 106 which operates an FET for enabling a preprogrammed stitch length for reverse feed when sewing a buttonhole.

Additionally, the MC 4 has two control lines to the bight servo system 6: bight override 108 which operates an FET for enabling a bight override control for effecting operator modification of the standard bight; and needle bar release 110 for signalling the bight servo system 6 that the needle bar is to be latched in an up position.

The feed override, bight override, and balance controls referred to above are similar to those disclosed in U.S. Pat. No. 4,016,821, dated Apr. 12, 1977, to Minalga, the teachings of which are incorporated herein by reference. For an example of how bight and feed data may be arranged in a memory similar to that contained within the MC 4, see U.S. Pat. No. 3,872,808, dated Mar. 25, 1975, to Wurst, the teachings of which are incorporated herein by reference.

Figure 2:
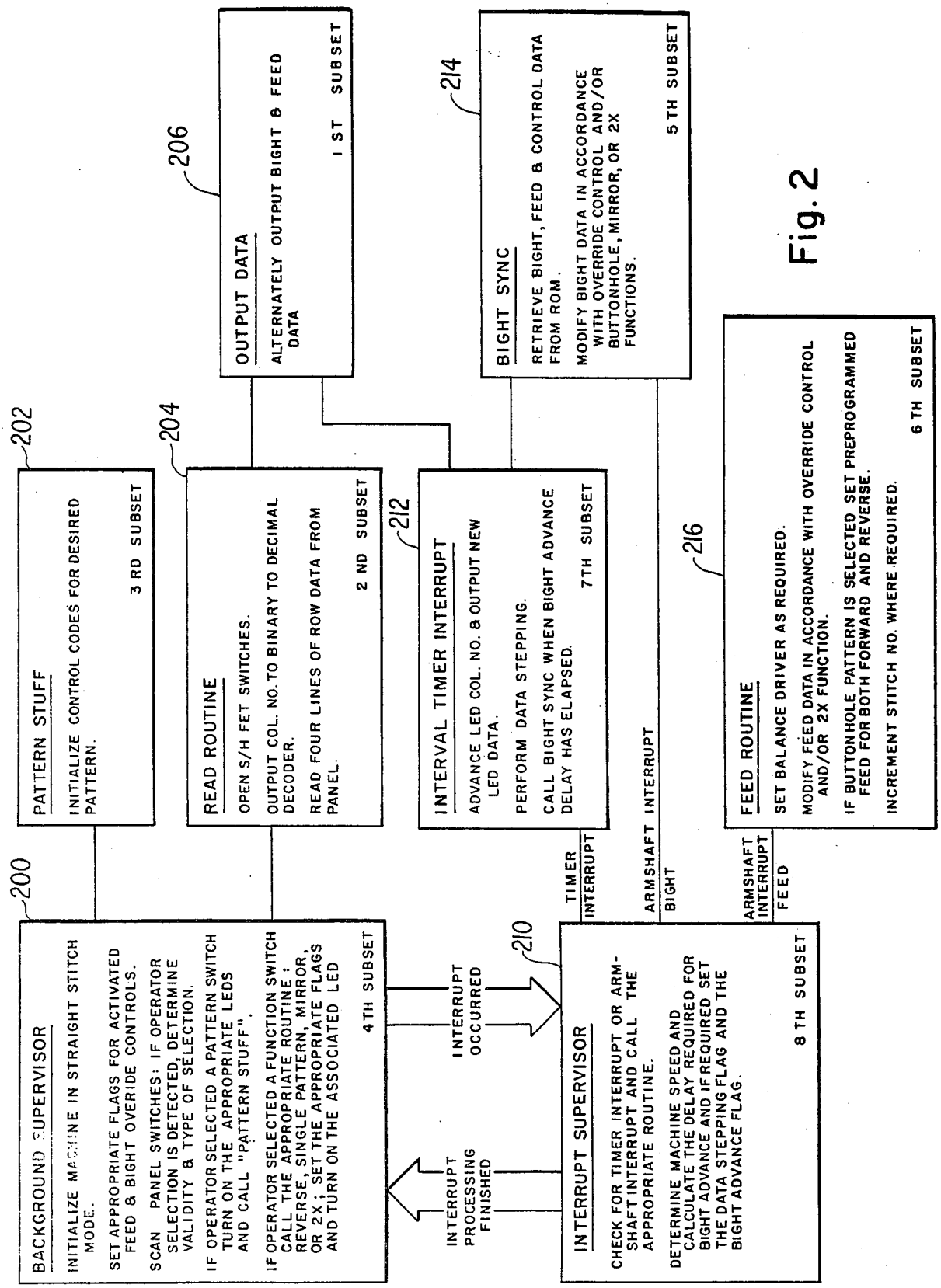
FIG. 2 is a block diagram of the programs executable by the microcomputer.
Figure 3:
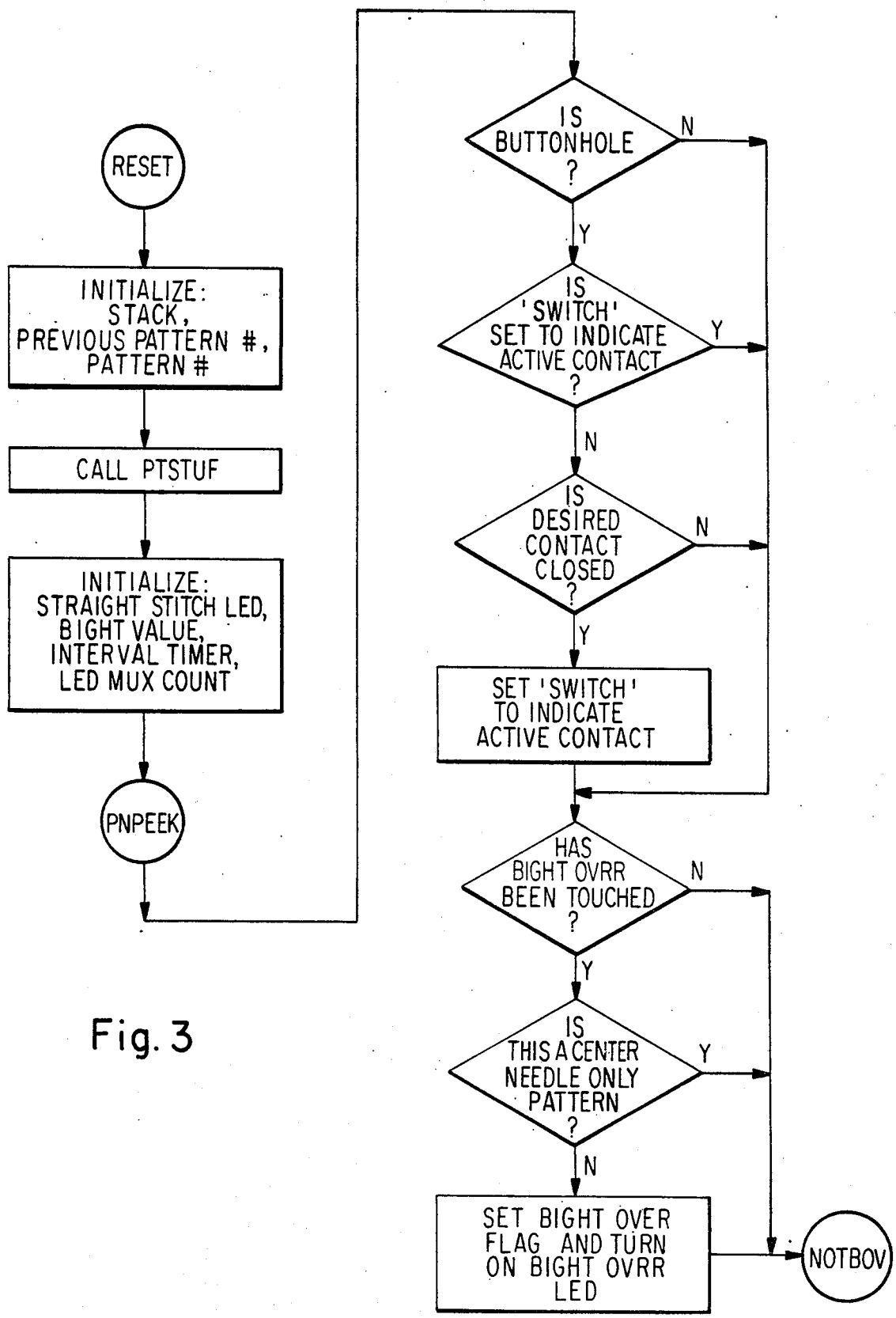
FIG. 3 through FIG. 19 comprise logic flow diagrams of the various control functions according to the present invention.
Figure 4:
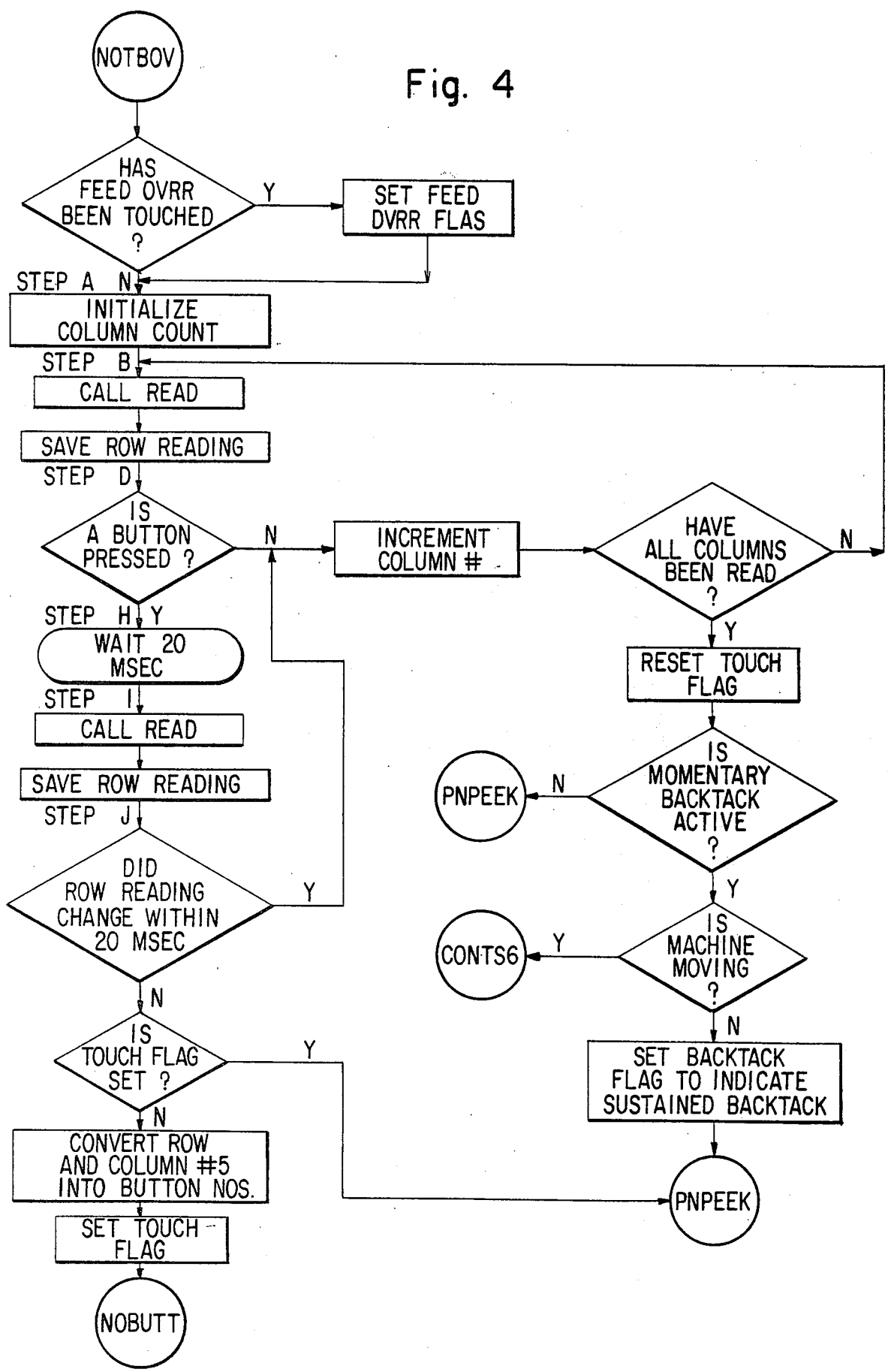
Figure 5:
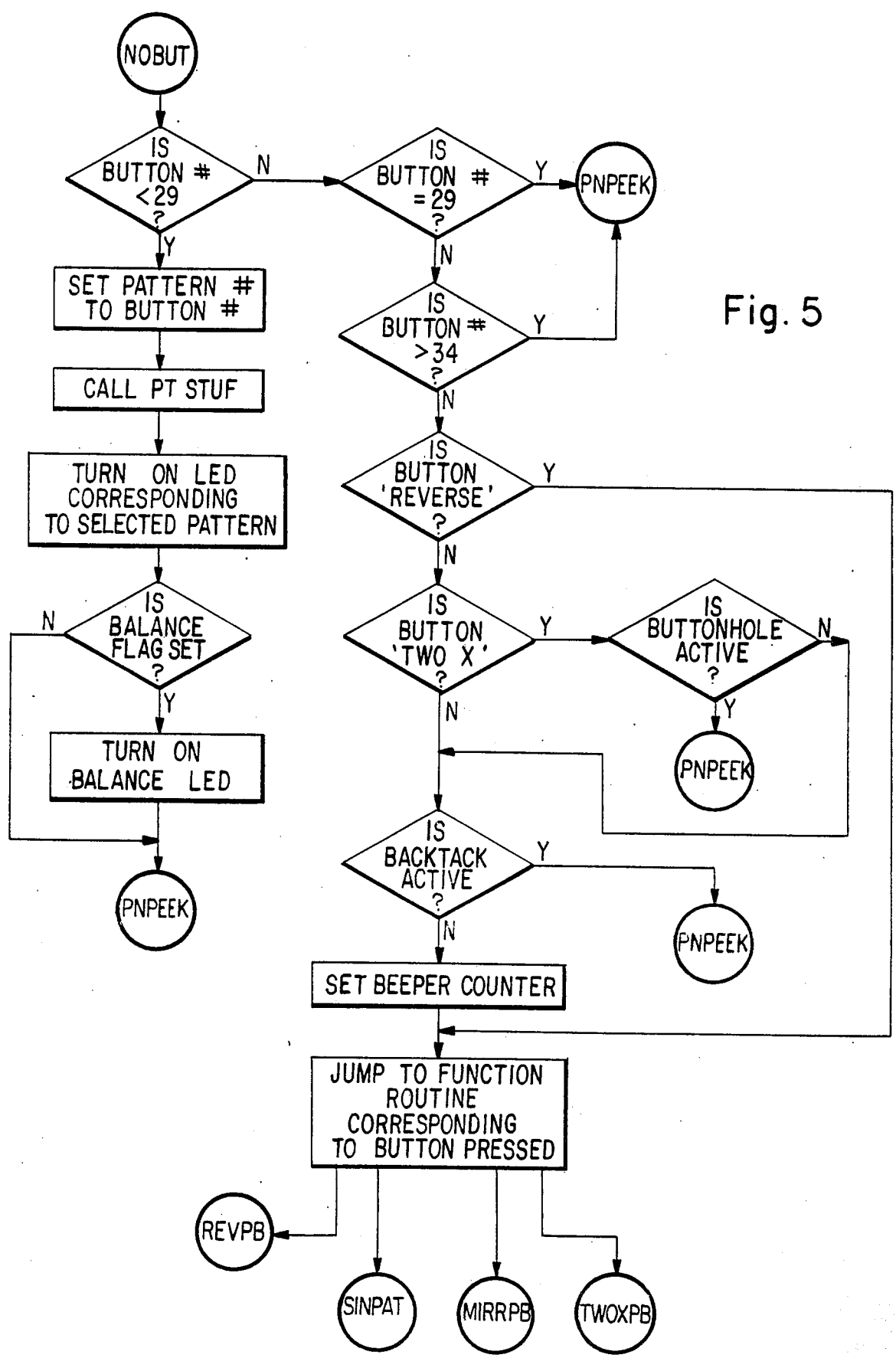
Figure 6:
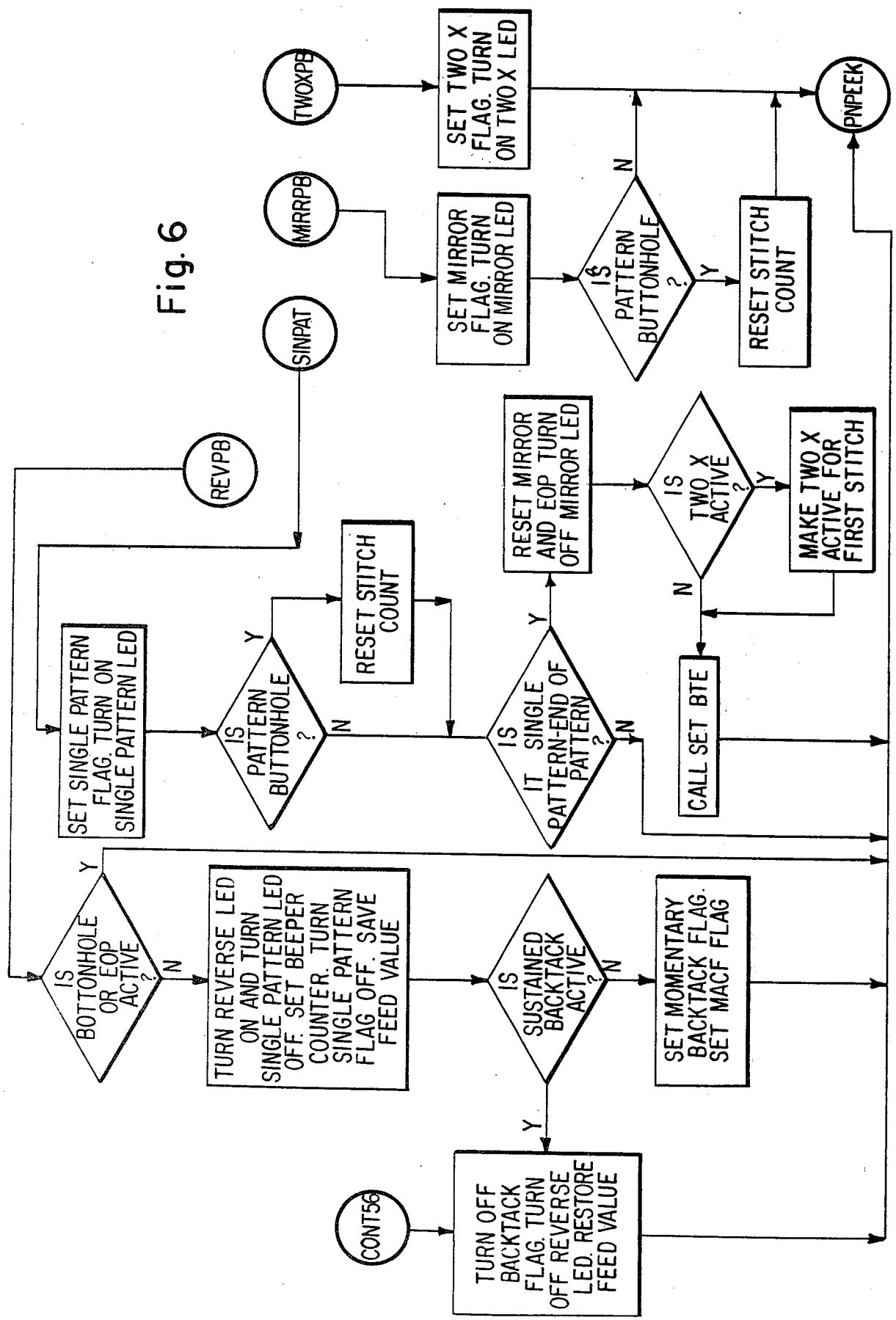
Figure 7:
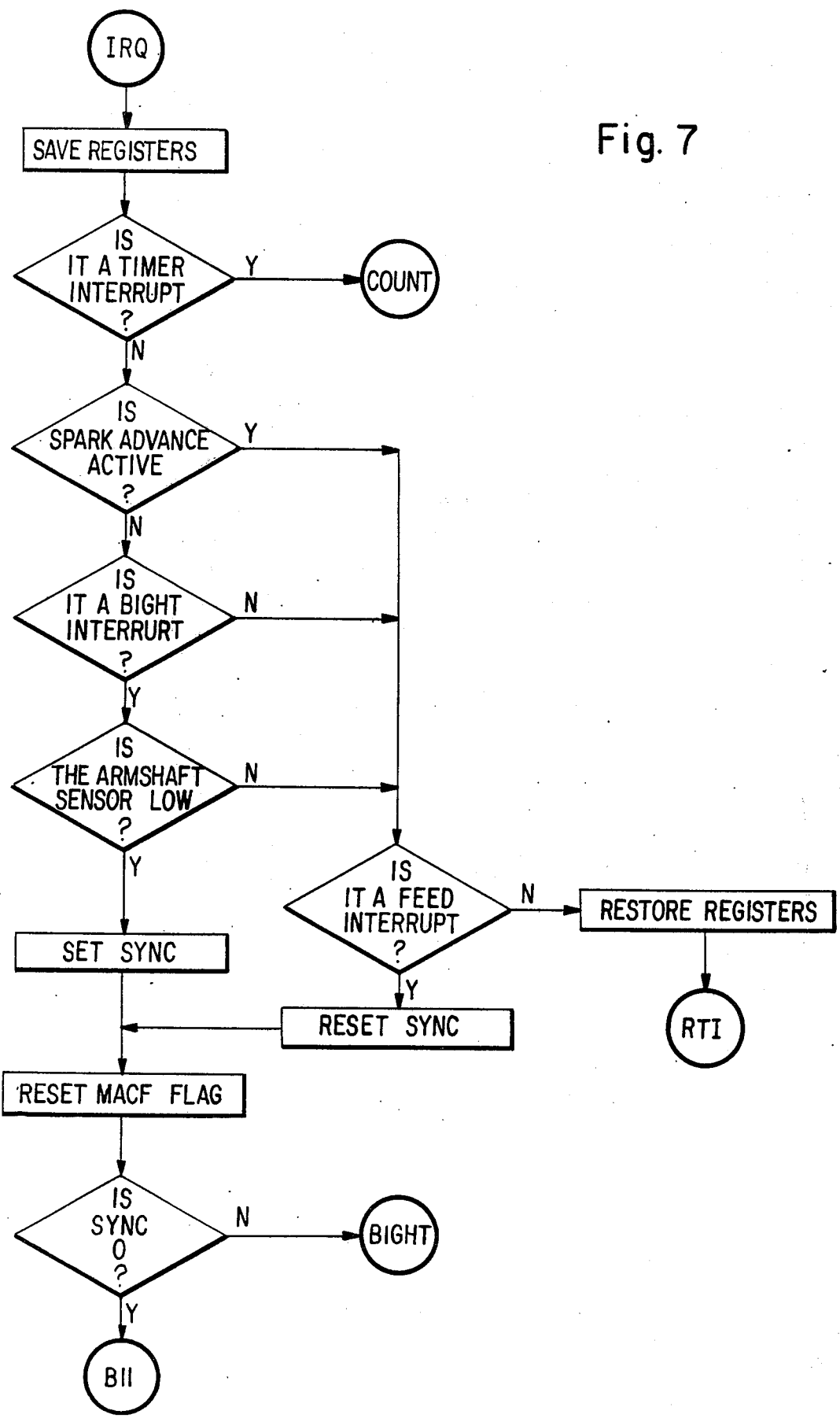
Figure 8:
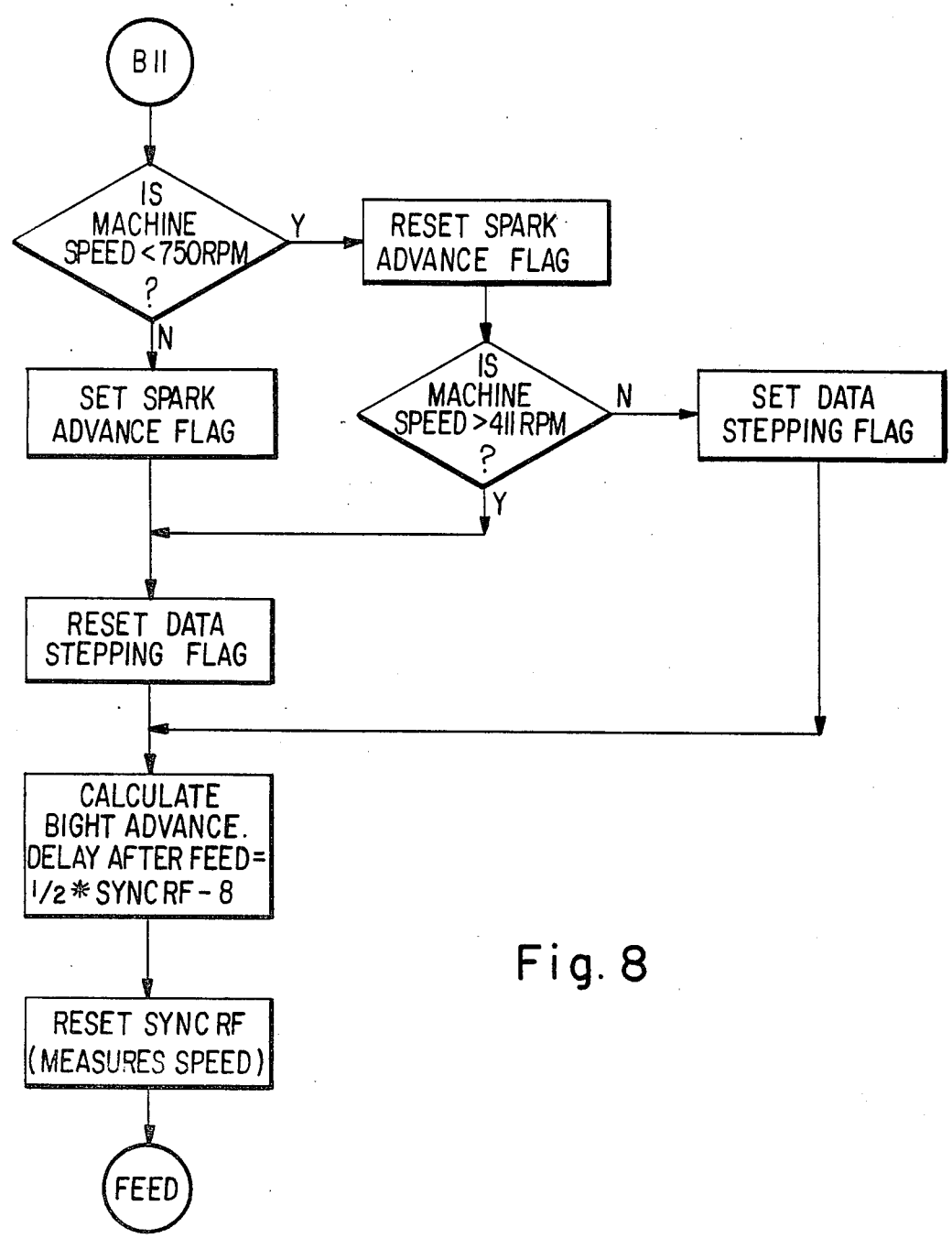
Figure 9:
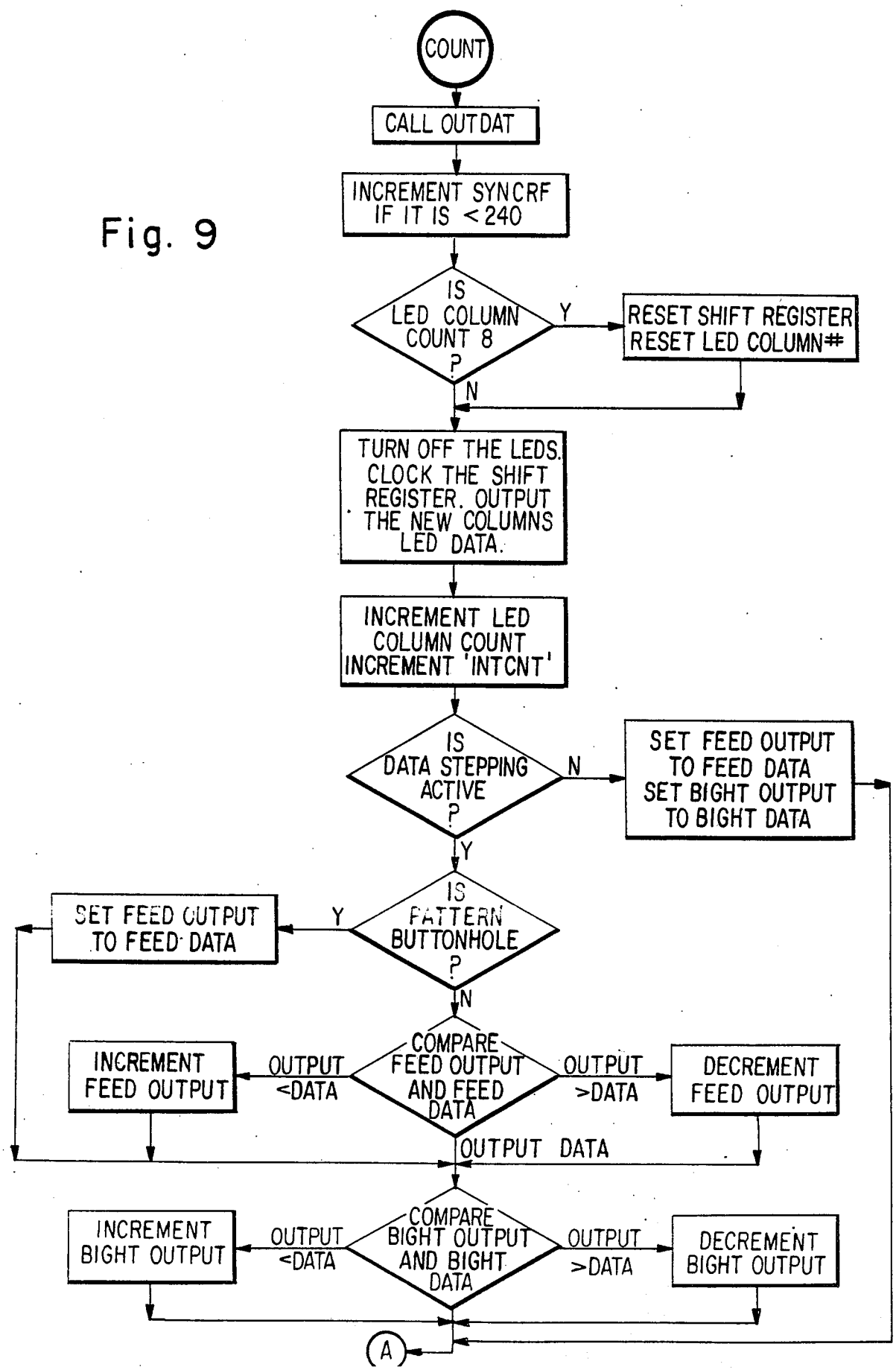
Figure 10:
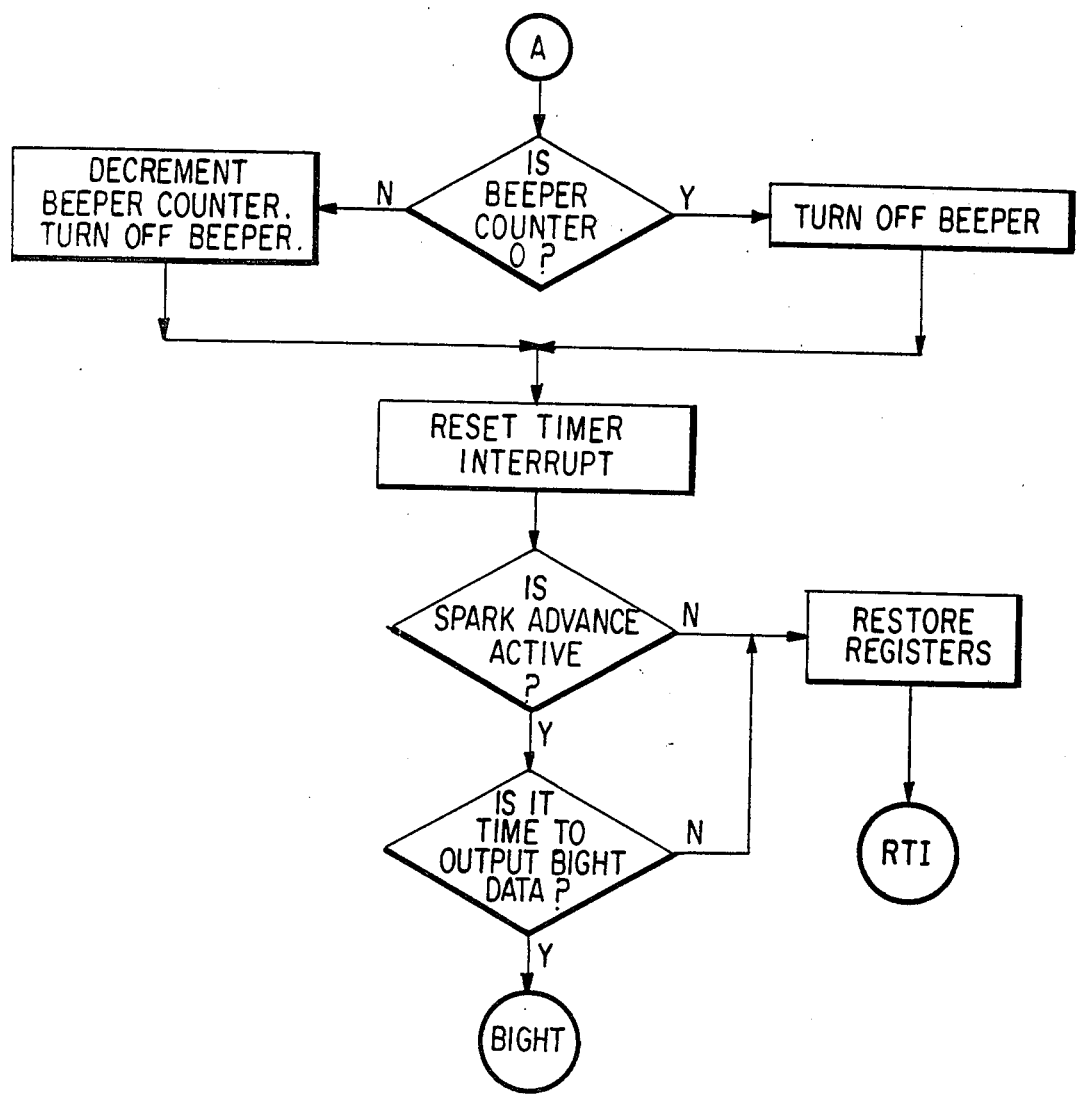
Figure 11:
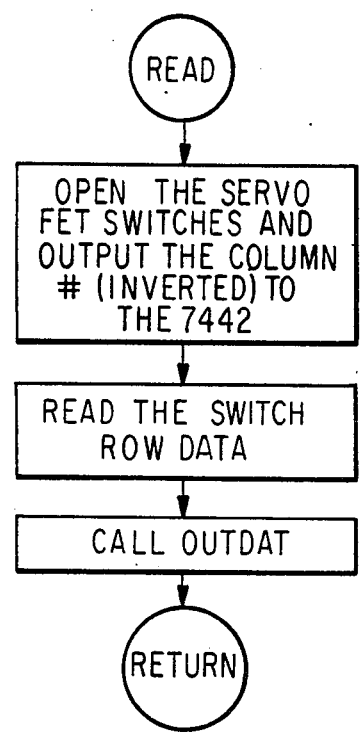
Figure 12:
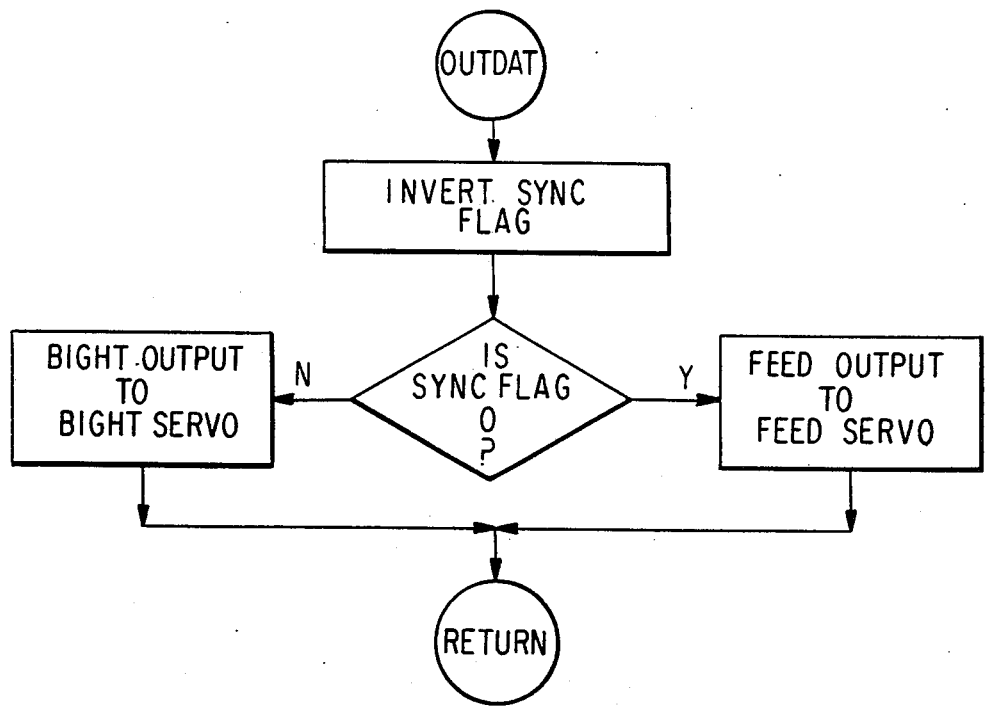
Figure 13:
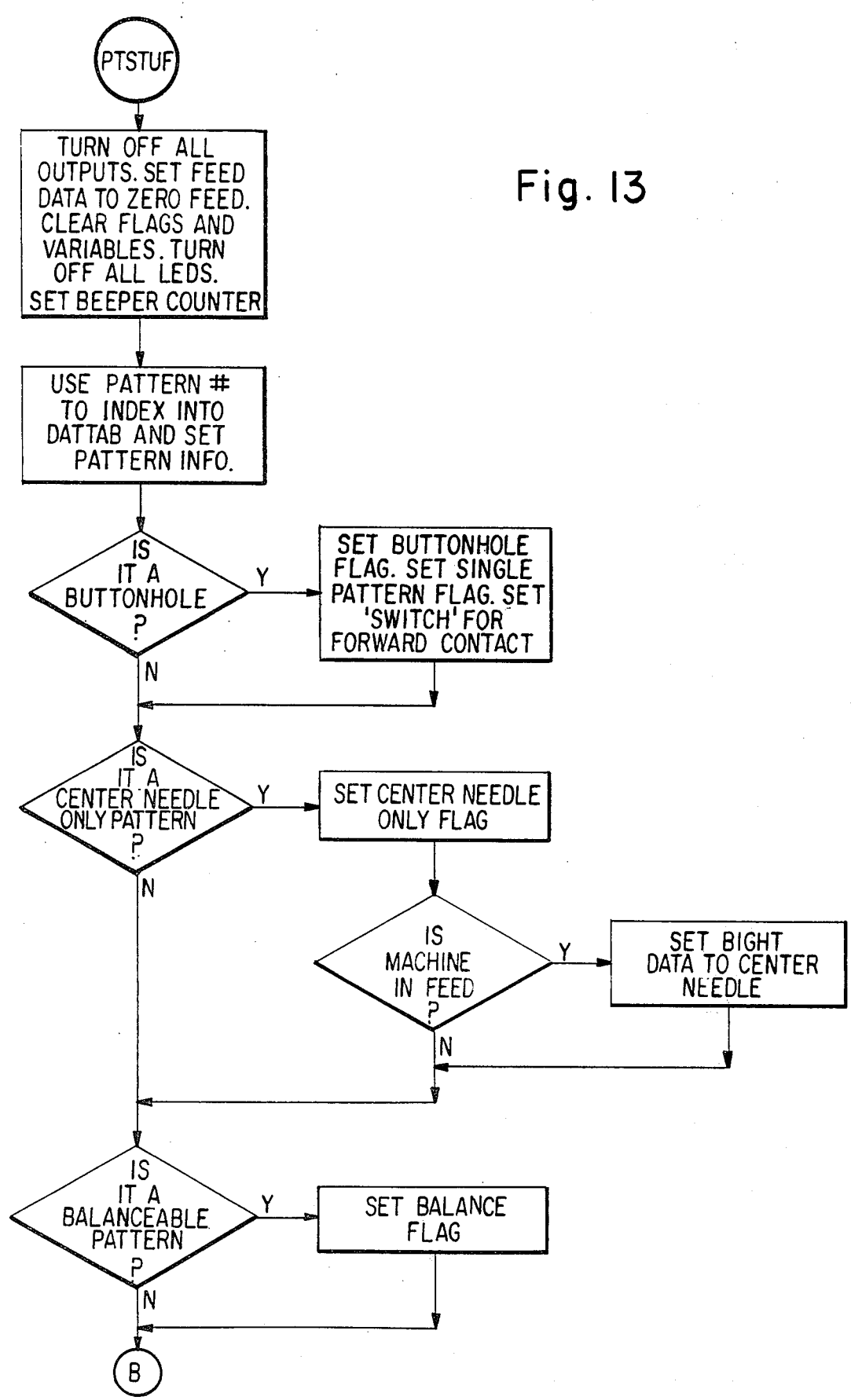
Figure 14:
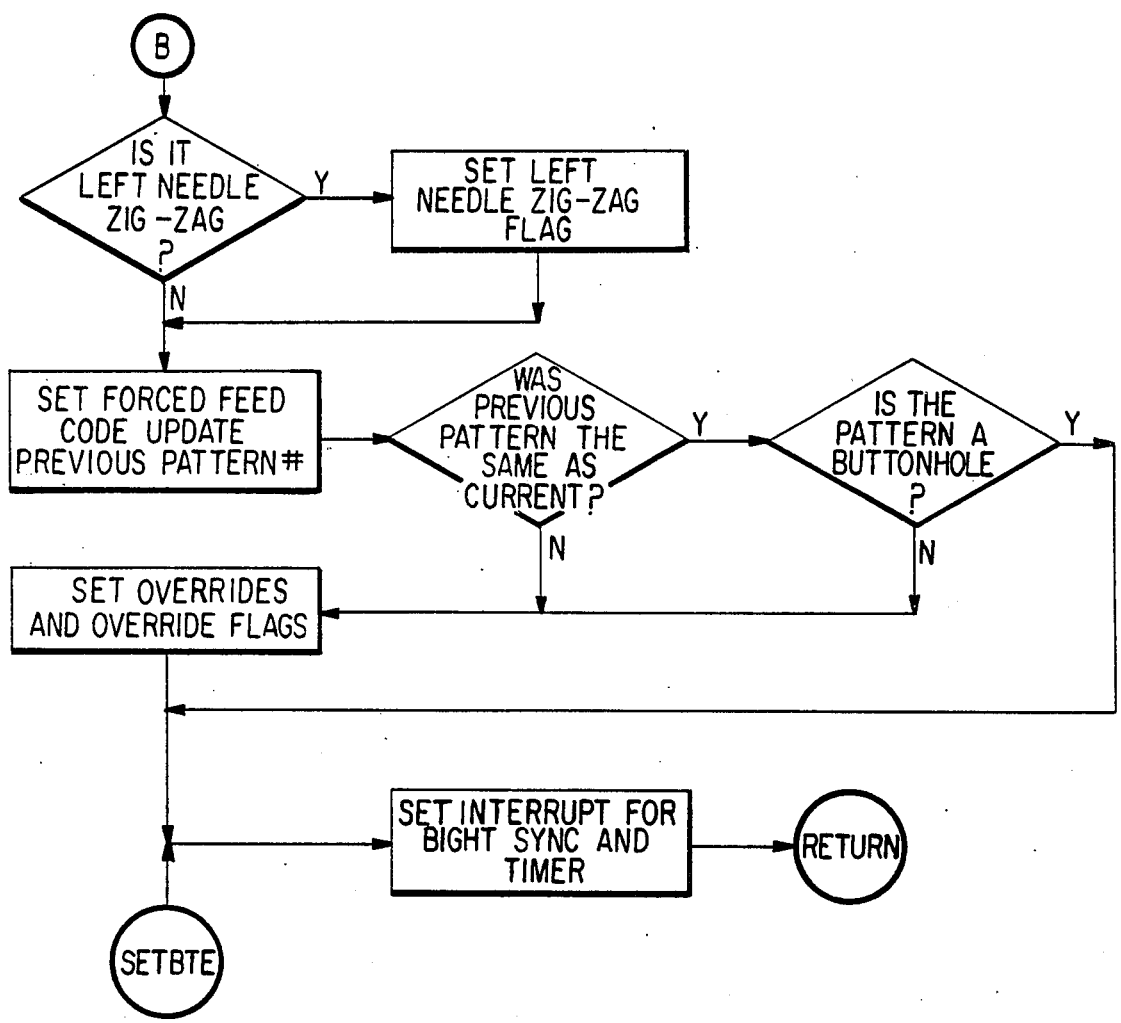
Figure 15:
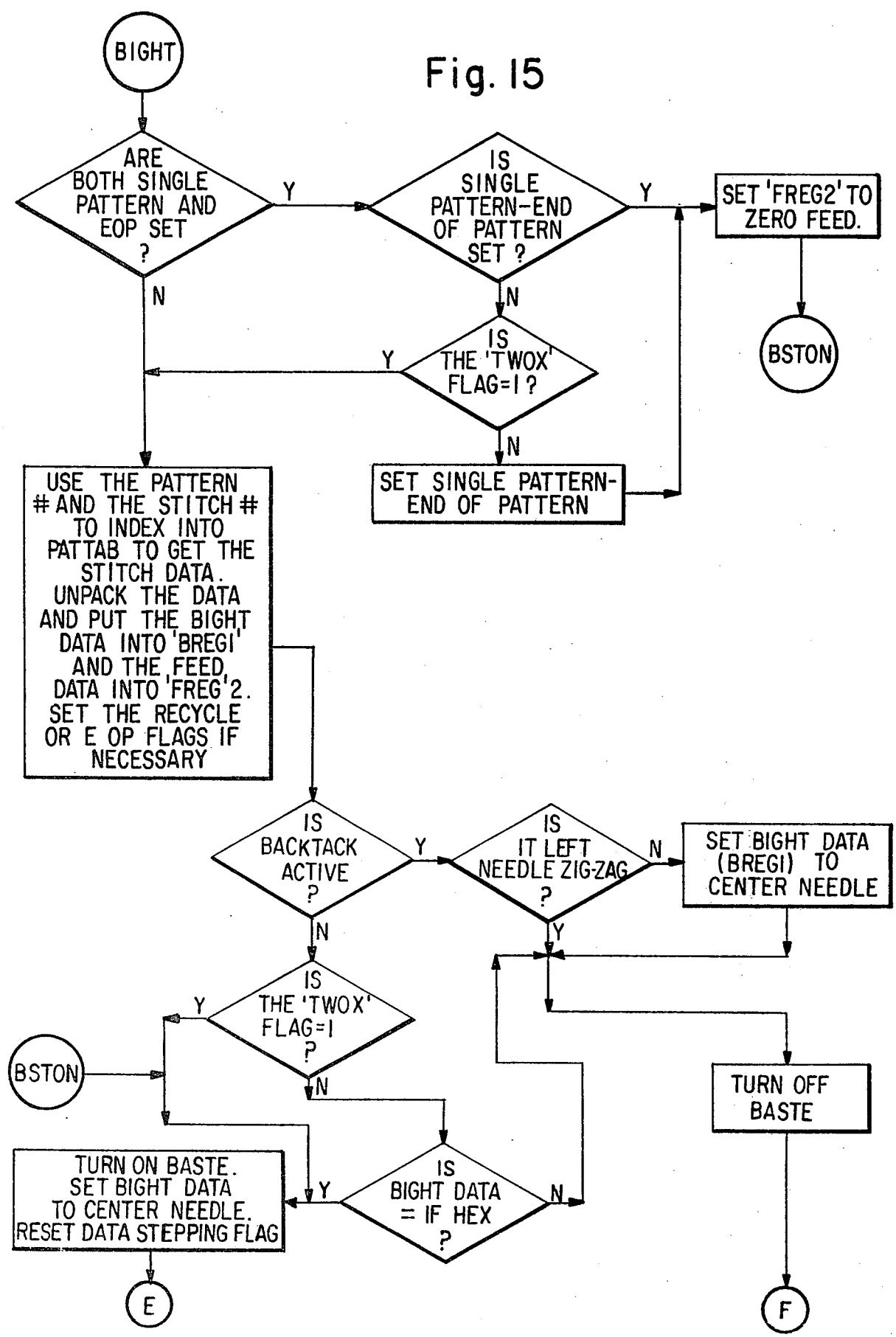
Figure 16:
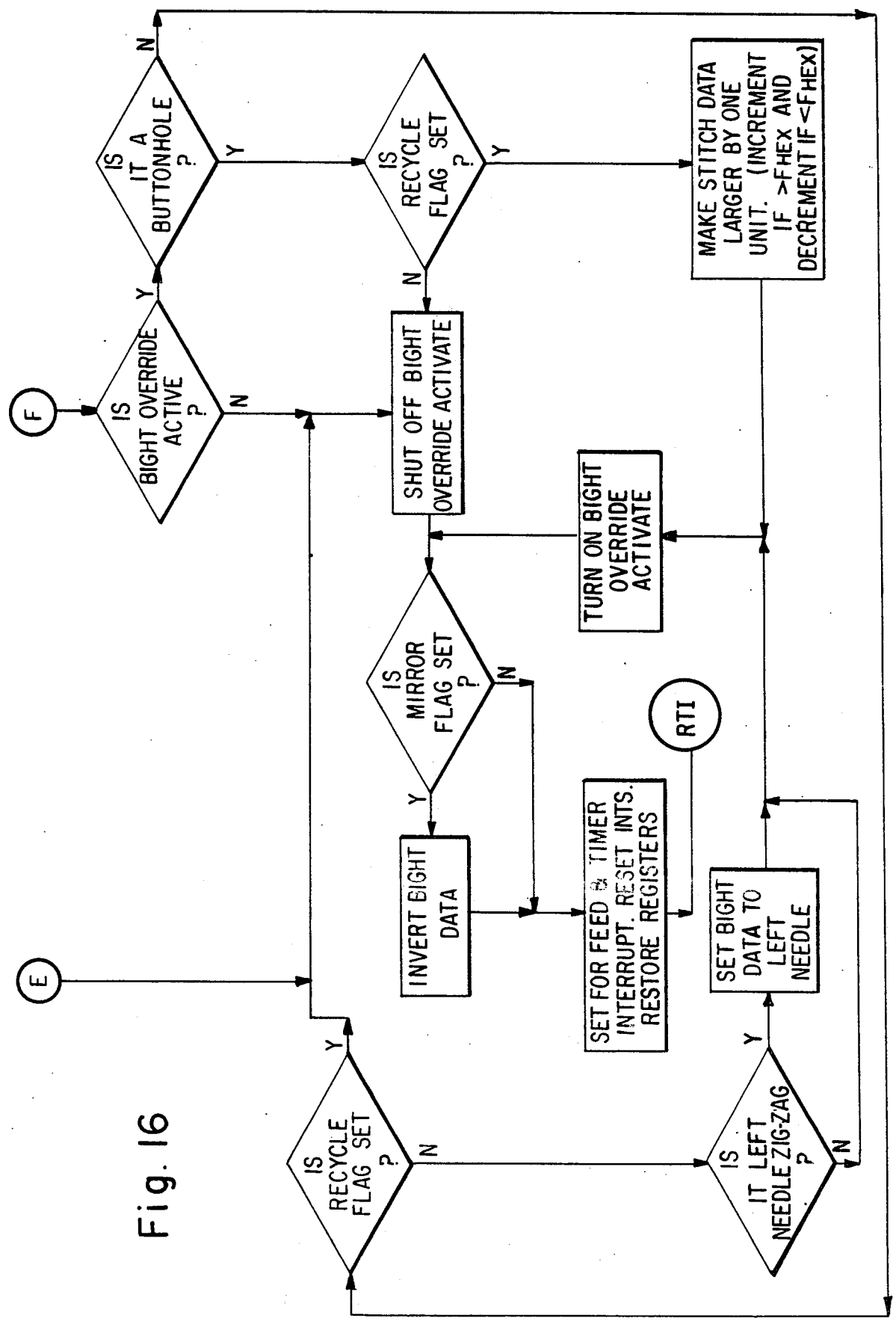
Figure 17:
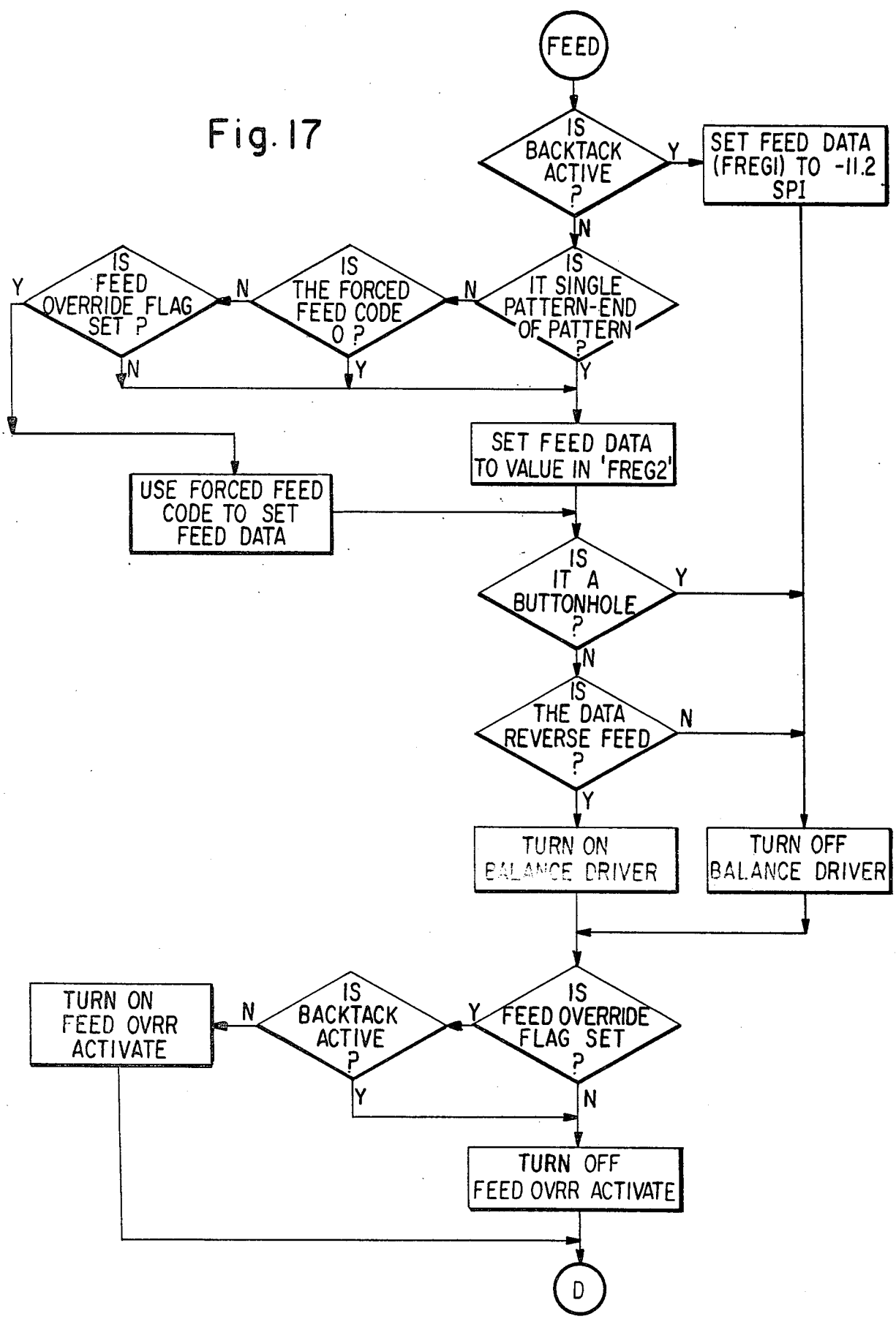
Figure 18:
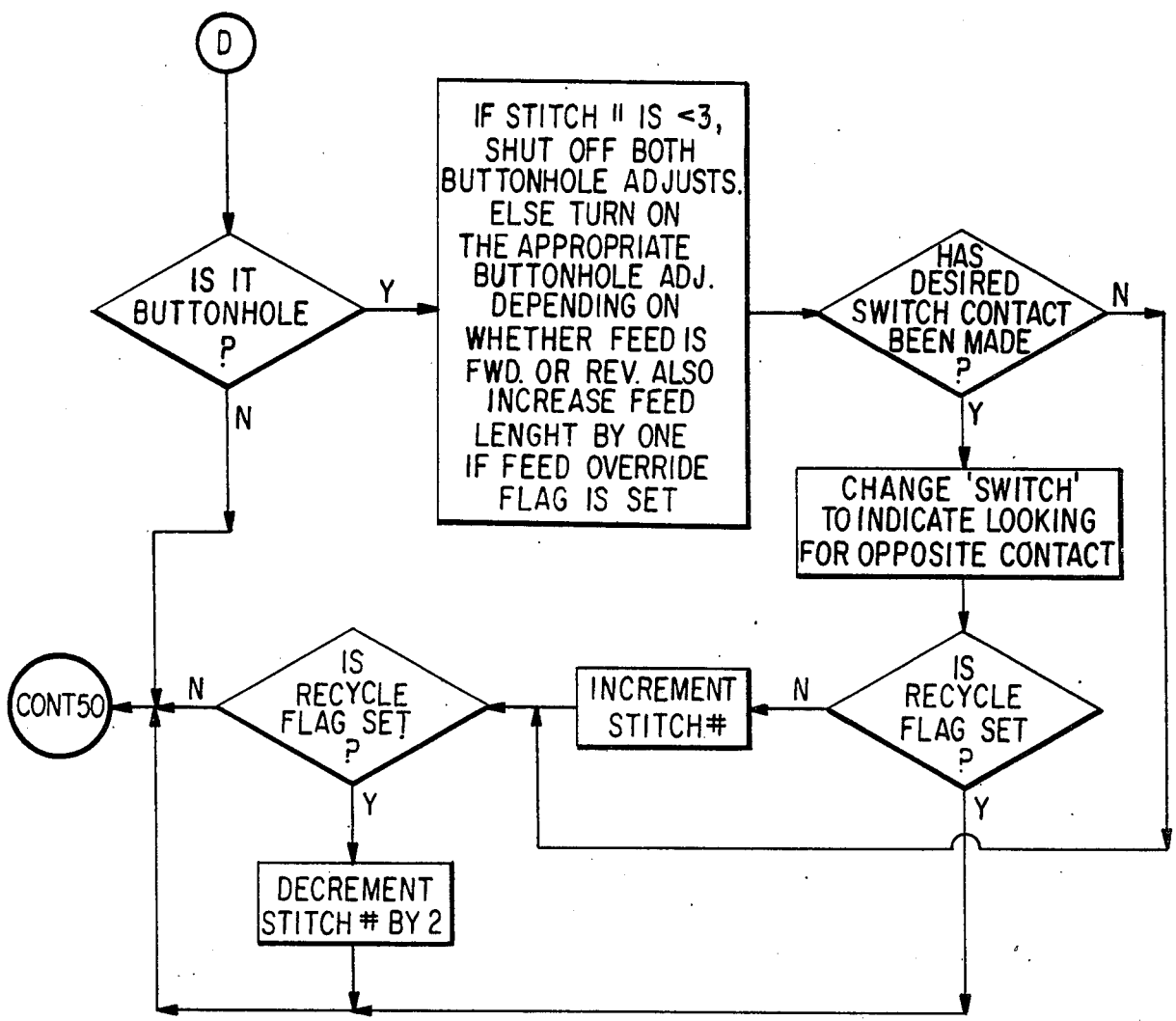
Figure 19:
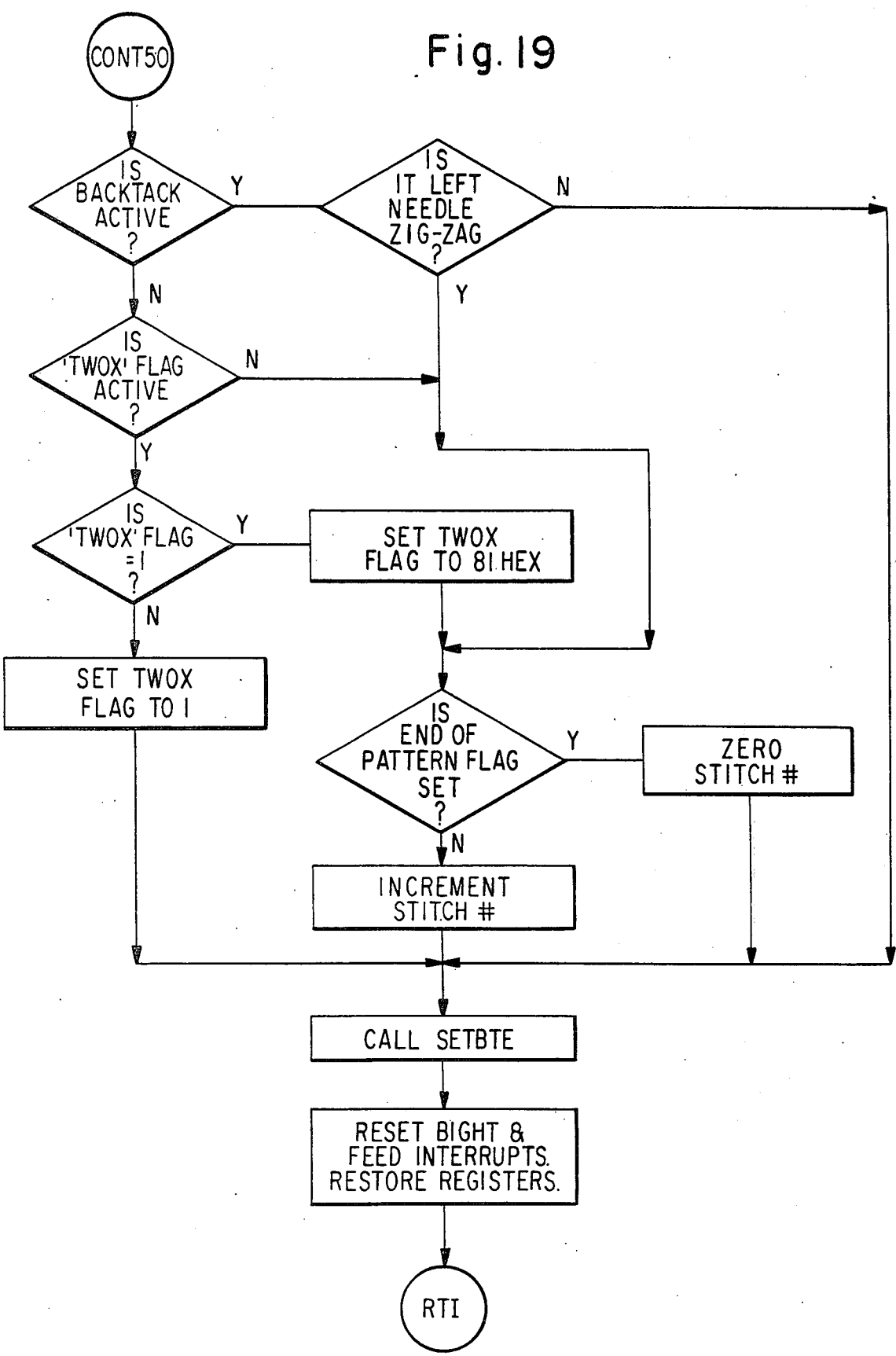

Referring now to FIG. 2, there is shown a functional block diagram of the programs executable by the MC 4 for controlling the operation of the sewing machine.

A background supervisor 200 is in continuous execution by the MC 4 and performs the following procedure. The background supervisor 200 will initialize the sewing machine in straight stitch mode. The pattern stuff routine 202 is then called and execution temporarily passed thereto for turning off all outputs and initialize all flags and counters within the programs to correspond to the requirements of the currently selected stitch pattern. The background supervisor 200 will then set the appropriate flags for any bight or feed override controls that have been activated by the operator, and begin scanning the switch matrix 60 for operator actuated switches. When an actuated switch is detected a 20 millisecond delay is executed then the switch matrix 60 is again examined to verify that the same switch as previously detected is still actuated. This being done, a determination is made as to the type of switch that has been actuated by the operator. If a stitch pattern switch has been selected by the operator then the appropriate LEDs will be set to be turned on and the pattern stuff routine 202 is again called to initialize all flags and counters within the programs to correspond to the requirements of the newly selected stitch pattern. If the operator has selected a function switch then the appropriate routine: reverse; single pattern; mirror; or two X, is called and execution is temporarily passed to that routine for modifying the pattern data and associated control data of the current stitch pattern in accordance with the function selected. Thus, if the two X function is selected by the operator, and say a heart stitch pattern had been previously selected, the standard pattern data for the heart will be modified so that the physical size of the pattern as sewn will be two times its original size.

The switch matrix is scanned one column at a time using the following procedure. The read routine 204 is called and execution temporarily passed thereto. The read routine applies a signal to both lines 24 and 26 thereby opening the FETs 20 and 22. A binary number from 0 to 9 is then applied to the four lines 72 which is decoded and translated into a decimal number and applied to the corresponding one of the ten lines 74 representing the columns 62. The four lines 76 representing the rows 64 are then read into memory. Prior to returning control of execution to the background supervisor 200, the read routine 204 calls the output data routine 206 which alternately closes the FET 20 or 22 and outputs the most current bight or feed data to the digital to analog converter 12 via the five lines 10 that corresponds to the closed FET. Thus, if the previous time the output data routine 206 had been called the FET 20 had been closed, this time the FET 20 will be opened and the FET 22 will be closed and feed data applied to the five lines 10. Every time that a column of the switch matrix 60 is scanned, bight or feed data is alternately passed to the bight or feed servo systems thereby assuring a sufficient refresh level to maintain drift free operation.

Execution of the background supervisor 200 may be interrupted in any of three ways and execution passed to the interrupt supervisor 210. This will occur when the MC 4 receives a feed sync signal on the line 40, a bight sync signal on the line 40, or a timer interrupt signal generated every millisecond by a clock internal to the MC 4.

When an interrupt occurs, the interrupt supervisor 210 determines which of the three types has occurred and, if a timer interrupt, will call the interval timer interrupt routine 212. This routine calls the output data routine 206 which, as stated above, alternately outputs the most current bight or feed data to refresh the bight and feed servo systems. This procedure assures drift free operation of the servo system in the event that the background supervisor 200 is in a wait state. The interval timer interrupt routine 212 will then advance the scanner state counter 90 to the next LED column number and output a signal on the corresponding line of the seven lines 92. Signals are then applied to the five lines 84 to activate the appropriate row drivers 80 and turn on the specific LED indicators associated with each operator actuated switch of the switch matrix 60.

The interrupt supervisor 210 determines the speed of the sewing machine. If greater than 750 RPM a bight advance flag is set indiating that bight advancing is required and the magnitude of required bight advance is calculated. If the machine speed is less than 411 RPM a data stepping flag is set indicating that data stepping is required.

The interval timer interrupt routine 212 examines the data stepping flag and, if set, will execute the following procedure. The bight and feed data that the output data routine 206 alternately outputs to the bight and feed servo system is initialized to a starting value. Every time a timer interrupt occurs the value of both the bight and feed data is incremented or decremented depending on the direction of needle or feed dog travel. This continues until the value of the incremented or decremented data reaches a magnitude equal to the magnitude of the corresponding data that is stored in memory and associated with the current stitch pattern being sewn. This procedure assures smooth and relatively noise free operation of the bight and feed mechanisms at relatively slow machine speeds.

The interval timer interrupt routine 212 also examines the bight advance flag and, if set, will execute the following procedure. The magnitude of required bight advance that had been previously calculated by the interrupt supervisor 210 is compared to the elapsed time since a feed sync signal has occurred. If substantially equal then the bight sync routine 214 is called and execution is temporarily passed thereto for performing the following procedure. The bight sync routine 214 will locate and retrieve from the memory bight, feed, and control data, referred to herein as descriptive data, corresponding to the current stitch pattern as well as indicative data including a stitch pattern member and other data unique to the particular stitch pattern. The bight data is modified in accordance with the setting of the bight override control, if operator activated, unless a buttonhole is being sewn. The bight data is further modified in accordance with any function switches that have been operator activated. Execution is then returned to the interrupt supervisor 210.

When the interrupt supervisor 210 determines that a bight sync interrupt has occurred the bight sync routine 214 is called and execution is temporarily passed thereto for performing the above described procedure. Execution is then returned to the interrupt supervisor 210.

When the interrupt supervisor 210 determines that a feed sync interrupt has occurred the feed routine 216 is called and execution is temporarily passed thereto for performing the following procedure. If the balance control has been actuated by the operator a signal is applied to the line 102 for closing an FET to enable a stitch length balance drive, not shown, which is a part of the feed servo system 8. The balance driver adjusts both the forward and reverse stitch length in accordance with the setting of the balance control. If the feed override control has been actuated by the operator the feed data will be modified in accordance therewith. If a buttonhole pattern has been selected by the operator; when sewing forward a signal is applied to the line 104 for closing a FET and enabling a buttonhole forward adjust circuit, not shown; when sewing in reverse a signal is applied to the line 106 for closing another FET and enabling a buttonhole reverse adjust circuit; not shown. These forward and reverse adjust circuits override all feed data to the feed servo system and are factory set to provide an optimal satin stitch that is desirable when sewing buttonholes. If the stitch pattern being sewn is not yet complete the stitch number counter is incremented and execution is then returned to the interrupt supervisor 210.

When the interrupt supervisor 210 has determined that all necessary processing within its control is complete, execution is then returned to the background supervisor 200 for panel scanning etc., as described above, until another interrupt occurs.

the programs, as described above, are coded in assembler language for the particular microcomputer utilized. In the present case, a Rockwell International 6500/1 is used having a 64 byte random access memory and a 2048 byte read only memory. There are a number of commercially available microcomputers that may be substituted. FIGS. 3 through 19 comprise program flow charts or logic flow diagrams illustrating the detailed logic steps performed by the microcomputer in controlling the sewing operation. These flow charts are self-explanatory and will be readily understood by one skilled in the art. Further explanation is not necessary.

The important and unique features of this invention are achieved through the utilization of a microcomputer operating in two modes of operation. A background mode and a hardware interrupt mode wherein the occurrence of certain physical events related to the operation of the sewing machine will cause such a hardware interrupt. In this way, critical hardware dependent functions necessary for the operation of the sewing machine can be performed when needed notwithstanding the state of execution of other programs. With this procedure drift free operation of the servo systems needed to drive the various sewing instrumentalities is achieved under all sewing conditions, even when the armshaft is not rotating. Further, the LED indicator lights will always be sufficiently refreshed to provide a reliable visual indication of the state of the selection panel.

While the teachings and principles of this invention, for purposes of this disclosure, have been applied to the bight and feed functions of a sewing machine, it is expressly understood that said teachings and principles may be applied to the control of any sewing instrumentality of a sewing machine.

Upon reviewing the present disclosure, a number of alternative constructions will occur to one skilled in the art. Such constructions may utilize various combinations of the basic routines described above and are considered to be within the spirit and scope of this invention.

We claim:

1. In an electronically controlled sewing machine having sewing instrumentalities for sewing a plurality of different stitch patterns, said sewing machine including a rotatable armshaft, signal means associated with said rotatable armshaft for providing a bight signal and a feed signal in timed relation to said sewing instrumentalities, panel selection means responsive to operator influence for selecting a pattern from said plurality of stitch patterns, and a microcomputer including a memory:

control means including a set of coded instructions that are stored in said memory and executable by said microcomputer for controlling the operation of said sewing machine, said controlling occurring in a first mode of execution of said microcomputer and in a second mode of execution of said microcomputer wherein said first mode of execution is effective continuously except for predetermined interruptions and said second mode of execution is effective only during said predetermined interruptions, said interruptions being effected in response to said bight signal and said feed signal.

2. The combination of claim 1 wherein said sewing machine includes a needle bar arranged for endwise reciprocation and transverse movement, bight logic means for imparting said transverse movement of said needle bar, a work feed means arranged for work feeding movement, and feed logic means for imparting said work feeding movement to said work feed means, and first means for outputting data to alternately drive said bight logic and said feed logic wherein said first means comprises a first subset of said set of coded instructions.

3. The combination of claim 2 wherein said panel selection means includes a plurality of stitch pattern switches arranged in a rectangular array of m columns and n rows where m and n are positive integers, and said sewing machine includes a decoder electrically connected to said switches being responsive to an input signal for applying an output signal to a specific one of said m columns of switches, and second means for:
 a. inhibiting said outputting data to said bight logic means and said feed logic means;
 b. applying said input signal to said decoder; and
 c. determining the presence of said input signal on one of said n rows of said switches;
wherein said second means comprises a second subset of said set of coded instructions.

4. The combination of claim 3 wherein: said memory contains indicative stitch pattern data for each of said plurality of different stitch patterns, said indicative stitch pattern data includes a unique identifying number corresponding to one of said plurality of stitch patterns and data relating thereto;, said memory further includes a plurality of control code memory cells; and said sewing machine includes third means for:
 a. inhibiting said outputting data to said bight logic and said feed logic;
 b. inhibiting said applying said input signal to said decoder;
 c. storing in said control code memory cells said indicative data including said identifying number relating to said selected stitch pattern;
wherein said third means comprises a third subset of said set of coded instructions.

5. The combination of claim 4 wherein: said panel selection means includes a plurality of function switches responsive to said operator influence for affecting said stitch pattern data; said control code memory cells include a bight memory cell, and a feed memory cell; said memory includes a plurality of function memory cells and a plurality of LED memory cells; and said sewing machine includes a bight override control and a feed override control, responsive to said operator influence, and fourth means for:
 a. continuously scanning said selection panel to detect said operator influence;
 b. determining the validity of said operator influence;
 c. identifying the specific one of said stitch pattern switches, function switches, and override controls indicated by said operator influence;
 d. controlling the sequence of execution of said first, second, and third subsets of coded instructions;
 e. setting said bight memory cell and said feed memory cell to correspond to said bight override control and said feed override control as indicated by said operator influence;
 f. setting said function memory cells to correspond to said plurality of function switches as indicated by said operator influence; and
 g. setting said plurality of LED memory cells to correspond to said stitch pattern switches, function switches, and override controls indicated by said operator influence, wherein said fourth means comprises a fourth subset of said set of coded instructions.

6. The combination of claim 5 wherein: said memory contains stitch pattern memory cells and further contains descriptive stitch pattern data for each of said plurality of different stitch patterns; said descriptive data including bight data to drive said bight logic means; and said sewing machine includes a bight override control responsive to operator influence for affecting said bight data and fifth means for:
 a. retrieving said descriptive stitch pattern data for said selected stitch pattern from said memory;

b. modifying said bight data to correspond to said bight override control as indicated by said operator influence and said function memory cells; and c. storing said descriptive data including said bight data as modified in said stitch pattern memory cells, wherein said fifth means comprises a fifth subset of said set of coded instructions.

7. The combination of claim 6 wherein: said control code memory cells include a balance memory cell; said descriptive data include feed data to drive said feed logic means for effecting forward and reverse movements of the work piece; and said sewing machine includes a feed override control responsive to operator influence for affecting said feed data, balance drive means responsive to operator influence for balancing said forward and reverse movements, and sixth means for:

a. enabling and disabling said balance driver means in accordance with the data content of said balance memory cell, and b. modifying said feed data to correspond to said feed override control as indicated by said operator influence and said function memory cells, wherein said sixth means comprises a sixth subset of said set of coded instructions.

8. The combination of claim 7 wherein said control code memory cells include a bight advance memory cell and a data stepping memory cell, and said sewing machine includes: a plurality of LED indicator lights arranged in indicative correspondence with said plurality of pattern switches, said function switches, said bight override control, and said feed override control; LED drive logic for selectively activating at least one of said plurality of LED indicator lights; and seventh means for:

a. outputting data contained in said plurality of LED memory cells to said LED drive logic for effecting said selective activation of at least one of said plurality of LED indicator lights in correspondence to said stitch pattern switches, function switches, and override controls indicated by said operator influence;

b. examining said data stepping memory cell for a predetermined condition and if said condition is present then outputting a series of discrete pulses to said feed logic wherein each of said pulses is of a different magnitude than the immediately preceeding pulse until the magnitude of one of said pulses is equal to the magnitude of said feed data contained in said descriptive stitch pattern data;

c. examining said bight advance memory cell for a predetermined condition and if said condition is present then causing said microcomputer to execute said fifth subset of coded instructions, wherein said seventh means comprises a seventh subset of said set of coded instructions.

9. The combination of claim 8 wherein: said microcomputer includes clock means for outputting periodic pulses; said interruptions of said first mode of execution are further effected in response to said periodic clock pulses; and said sewing machine includes eighth means for:

a. distinguishing between said interruptions effected in response to said bight signal, said feed signal, and said periodic clock pulses and causing said microcomputer to execute one of said seventh, said fifth, or said sixth subset of coded instructions respectively;

b. determining the speed of said sewing machine and comparing with a predetermined reference speed and if less than said reference speed then setting said data stepping memory cell to said predetermined condition, if said determined speed is greater than said reference speed then setting said bight advance memory to said predetermined condition wherein said eighth means comprises an eighth subset of said set of coded instructions.

10. The combination of claim 2 wherein: said memory contains indicative stitch pattern data for each of said plurality of different stitch patterns, said indicative stitch pattern data includes a unique identifying number corresponding to one of said plurality of stitch patterns and data relating thereto; said memory further includes a plurality of control code memory cells; and said sewing machine includes third means for:

a. inhibiting said outputting data to said bight logic and said feed logic;

b. rendering said input signal to said decoder ineffective;

c. storing in said control code memory cells said indicative data including said identifying number relating to said selected stitch pattern;

wherein said third means comprises a third subset of said set of coded instructions.

11. The combination of claim 1 wherein: said panel selection means includes a plurality of function switches responsive to said operator influence for affecting said stitch pattern data; said memory includes control code memory cells including a bight memory cell, and a feed memory cell; said memory further includes a plurality of function memory cells and a plurality of LED memory cells; and said sewing machine includes a bight override control and a feed override control, responsive to said operator influence, and fourth means for:

a. continuously scanning said selection panel to detect said operator influence;

b. determining the validity of said operator influence;

c. identifying the specific one of said stitch pattern switches, function switches, and override controls indicated by said operator influence;

d. controlling the sequence of execution of said first, second, and third subsets of coded instructions;

e. setting said bight memory cell and said feed memory cell to correspond to said bight override control and said feed override control as indicated by said operator influence;

f. setting said function memory cells to correspond to said plurality of function switches as indicated by said operator influence; and g. setting said plurality of LED memory cells to correspond to said stitch pattern switches, function switches, and override controls indicated by said operator influence, wherein said fourth means comprises a fourth subset of said set of coded instructions.

12. The combination of claim 2 wherein: said memory contains stitch pattern memory cells and further contains descriptive stitch pattern data for each of said plurality of different stitch patterns; said descriptive data including bight data to drive said bight logic means; and said sewing machine includes a bight override control responsive to operator influence for affecting said bight data and fifth means for:

a. retrieving said descriptive stitch pattern data for said selected stitch pattern from said memory;

b. modifying said bight data to correspond to said bight override control as indicated by said operator influence and said function memory cells; and c. storing said descriptive data including said bight data as modified in said stitch pattern memory cells, wherein said fifth means comprises a fifth subset of said set of coded instructions.

13. The combination of claim 2 wherein said controlling includes said outputting data both during said first mode of execution and during said second mode of execution of said microcomputer so that drift of said needle bar and said work feed means is constrained within predetermined limits.

* * * * *